United States Patent [19]
Bowman et al.

[11] Patent Number: 5,245,137
[45] Date of Patent: Sep. 14, 1993

[54] LOAD MEASURING SYSTEM FOR REFUSE TRUCKS

[75] Inventors: Allan Bowman, Newmarket; Ken Giffen, North York, both of Canada

[73] Assignee: Mobile Computing Corporation, Toronto, Canada

[21] Appl. No.: 881,967

[22] Filed: May 12, 1992

Related U.S. Application Data

[63] Continuation-in-part of Ser. No. 637,914, Jan. 7, 1991, Pat. No. 5,178,226.

[51] Int. Cl.$^5$ .................... G01G 19/08; G01G 19/40; B65G 69/00
[52] U.S. Cl. ................................ 177/139; 177/25.14; 177/1; 414/21
[58] Field of Search .................. 177/139, 25.14, 1; 414/21

[56] References Cited

U.S. PATENT DOCUMENTS

| | | |
|---|---|---|
| 2,757,923 | 8/1956 | Lefsheik . |
| 2,851,171 | 9/1958 | Martin et al. . |
| 3,063,576 | 11/1962 | Hofmeister . |
| 3,196,966 | 7/1965 | Kennedy . |
| 3,290,931 | 12/1966 | Fowkes et al. . |
| 3,321,035 | 5/1967 | Tarpley . |
| 3,612,490 | 10/1971 | Bopp et al. . |
| 3,650,340 | 3/1972 | Bradley . |
| 3,659,665 | 5/1972 | Godwin et al. . |
| 3,669,756 | 6/1972 | Bradley et al. . |
| 3,724,575 | 4/1973 | Kutsay . |
| 3,827,514 | 8/1974 | Bradley . |
| 3,828,295 | 8/1974 | Bradley . |
| 3,857,452 | 12/1974 | Hartman . |
| 3,879,998 | 4/1975 | Bradley . |

(List continued on next page.)

FOREIGN PATENT DOCUMENTS

| | | |
|---|---|---|
| 1255797 | 6/1989 | Canada . |
| 2006042 | 12/1989 | Canada . |

OTHER PUBLICATIONS

Weigh Bar Principle of Operation Weigh-Tronix (Date Unknown).
Nobel Electronik Product literature (Date Unknown).
Article by Scharf Powder and Bulk Engineering Sep. 1987.
Product Literature Full Bridge Thin Beam Load Cells LCL and LCM series (Date Unknown).

Primary Examiner—George H. Miller, Jr.
Attorney, Agent, or Firm—Bereskin & Parr

[57] ABSTRACT

A method for determining a weight of material being emptied from a container is shown. The container is lifted to and lowered from an emptying position in a lift empty and lower cycle by an arm which has at least two sensors mounted on it. The method includes selecting at least one measurement position, calibrating the sensors by recording the respective outputs from each of the sensors for both an empty arm and for an arm lifting and lowering a calibrating weight. The outputs recorded for the calibrating weight can then be subtracted from the outputs recorded for the empty arm. Then, an unknown load can be lifted emptied and lowered with the output of the sensors being similarly recorded at the measurement position. By subtracting the output recorded during the lifting portion of the cycle for the unknown load from the output recorded during the lowering cycle for the unknown load a change in output for each sensor at the measurement position can be obtained. The change in output of the sensors can then be compared to the change in output recorded for the calibration step and a weight value calculated. In another aspect of the present invention an apparatus is disclosed having at least two sensors mounted to a sensing portion of an arm. Output from each sensor is independently recorded and used in obtaining calibration values and actual weight values.

17 Claims, 12 Drawing Sheets

U.S. PATENT DOCUMENTS

| | | | |
|---|---|---|---|
| 3,910,364 | 10/1975 | Baker . | |
| 4,042,049 | 8/1977 | Reichow et al. . | |
| 4,095,660 | 1/1978 | Johansson . | |
| 4,102,031 | 7/1978 | Reichow et al. . | |
| 4,148,369 | 4/1979 | Mercer, Jr. . | |
| 4,281,729 | 8/1981 | Farley et al. . | |
| 4,393,951 | 7/1981 | Horst-Rudolf . | |
| 4,420,053 | 12/1983 | Russo . | |
| 4,421,186 | 12/1983 | Bradley . | |
| 4,623,029 | 11/1986 | Bambauer et al. . | |
| 4,645,018 | 2/1987 | Garbade et al. | 177/139 X |
| 4,714,122 | 2/1987 | Appleton et al. | 177/139 |
| 4,771,837 | 9/1988 | Appleton et al. | 177/139 |
| 4,824,315 | 4/1989 | Naub | 177/141 |
| 4,831,539 | 5/1989 | Hagenbuch . | |
| 4,839,835 | 6/1989 | Hagenbuch . | |
| 4,854,406 | 8/1989 | Appleton et al. | 177/139 |
| 5,038,876 | 8/1991 | Smith | 177/139 |
| 5,064,008 | 11/1991 | Smith . | |
| 5,065,828 | 11/1991 | Smith . | |
| 5,065,829 | 11/1991 | Smith . | |
| 5,083,624 | 1/1992 | Reichow | 177/139 |

LOAD MEASURING SYSTEM FOR REFUSE TRUCKS

This is a Continuation-in-Part of Ser. No. 07/637,914 filed Jan. 7, 1991, U.S. Pat. No. 5,178,226.

FIELD OF THE INVENTION

This invention relates generally to the field of load-weighing systems. In particular this invention relates to the load-weighing systems and components of such systems which may be used to determine the weight of refuse emptied from a container into a refuse truck.

BACKGROUND OF THE INVENTION

Garbage is a major environmental problem, especially now for urban centers. Typically garbage is collected from various premises and taken to a disposal site. Often such disposal sites are landfill sites, where the garbage is dumped into a hole in the ground. However, landfill disposal sites are expensive to operate and tend to fill up over time, thus needing to be replaced. Rising land costs have made replacement of landfill sites expensive. Additionally, landfill sites may be environmentally hazardous, with chemicals, pollutants and the like leaching into the ground water supply.

Faced with the rising costs and concerns about landfill sites, the operators of landfill sites have begun to dramatically increase the fee charged for disposing garbage at such sites. Typically now the fee charged is based on the weight of garbage disposed of. Thus, each refuse truck seeking to off-load garbage is weighed on the way into the landfill site and weighed on the way out of the landfill site. The weight difference is then calculated and a fee is paid in accordance with that weight difference.

Additionally, concerns have been raised about the total weight of individual vehicles which travel public roads. The greater the weight of the vehicle the greater the wear of the roadway. Weight restrictions have been imposed on many roadways and substantial fines may be payable for overweight vehicles. The landfill site weight records can be used as evidence of overweight violations by the appropriate regulatory agency. Both of these trends, namely increased costs of dumping and increased overweight fines, increase the importance for refuse truck operators being able to know the total weight of the refuse being carried in their trucks, and the incremental weight being added by each additional pickup.

In a typical refuse collection operation, a customer signs a contract which guarantees that a refuse receptacle will be emptied on a periodic basis. Presently the contract is typically based upon a flat fee and does not take into account the actual weight of refuse to be removed from the site. The weight of the refuse may vary with demolished building materials being very heavy whereas cardboard packing or paper packing products are very bulky, but light. The refuse hauler pays to dump the refuse at the landfill or other disposal site based upon the weight of refuse being disposed. However, the customer is charged on a flat fee for a given time, such as a week or month, resulting in customers with light refuse being over-charged, while customers with heavy refuse are undercharged. What is desired therefore, is a way for the refuse truck operator and the refuse-hauling companies to determine the weight of refuse being hauled from each customer's container each time. Preferably, such measurement device would enable the operator of the refuse vehicle to know also what the weight of the refuse of the truck at any given time was to avoid overloading the truck and thus being liable for over-weight fines.

There are several examples of past devices which attempt to provide the desired weight information. However, these prior devices all suffer from various unsuitabilities. For example, there are devices which require that the lifting, emptying and return cycle for emptying a container into the refuse truck be slowed down or stopped so that a weight reading can be made. The stopping or slowing down of the lifting and lowering motion of the container is unsuitable for several reasons. Firstly, there is a time loss associated with such a delay which is unacceptable. Secondly, the machinery used to effect the lifting is often quite powerful, but not very nimble. Thus, requiring the cycle to be slowed or stopped typically causes large vibrations, which may create excessive wear on the equipment and premature breakdown. Thus, devices which require the operation to be stopped or slowed down in order to effect measurement are not suitable. Examples of such devices may be found in U.S. Pat. No. 4,645,081 to Garbade and German Publication 33 32 058.

Other devices have been proposed which involve vertical load cells upon which the container being weighed is placed. However, these also have a number of disadvantages. As indicated previously, the equipment while powerful often vibrates upon beginning or ending its motion. Thus, placing containers directly on vertical load cells is unsuitable, because it is difficult to protect the load cells from excessive wear by the rough use that such equipment typically gets. An example of such a device is again U.S. Pat. No. 4,645,081 and U.S. Pat. No. 4,714,122.

Other systems have proposed for example measuring the fluid pressure of the hydraulic cylinders, which are used to effect the lifting of the refuse containers. Examples of such systems include U.S. Pat. Nos. 4,771,837; 4,824,315; and 4,854,406. However, in each of these devices the pressure sensed is remote from the actual loading causing the pressure. Thus, other factors affect the pressure reading and the results are generally unreliable.

Another system is that shown in U.S. Pat. No. 5,083,624 which shows mounting a special transducer onto various parts of a vehicle axle or lift arm. However, the transducer needs to be specially machined, is non-load bearing and thus is remote from the actual loads, and does not take into account the variable positioning of the center of gravity of the load. Thus, this prior invention shares the same shortcomings as the others in not being able to determine weight.

Finally, there is the type of system like that proposed in U.S. Pat. No. 3,724,575, which teaches mounting a pair of strain gauges inside a uniform beam, loading the beam beyond the second strain gauge with an unknown weight, and wiring the gauges together so that the difference between gauge detections is in constant fixed proportion to the magnitude of the weight. However this prior invention requires special modification and weakening of the fork lift arm, requires a gauge mounting surface inside the beam parallel to the neutral axis, and a beam of special characteristics, namely being of uniform modulus of elasticity and moment area of inertia. Thus this prior device is impractical for application to existing non-uniform mechanisms or mechanisms where sensors cannot be mounted parallel to the neutral axis.

What is desired therefore, is a method of accurately determining the weight emptied from a container being lifted, emptied and lowered without requiring slowing or stopping of the lifting and lowering cycle, or relying on indirect readings such as from the hydraulic system or non-load bearing sensors, and one which is practical, and does not require hollowed-out or uniform special beam sections.

SUMMARY OF THE PRESENT INVENTION

A method of determining a weight of material being emptied from a container wherein said container is lifted to and lowered from an emptying position in a lift, empty and lower cycle by an arm means, and wherein mounted on said arm means are at least one front and at least one rear first sensor having respective first outputs in an unknown proportion to the weight of said container, said method comprising:

a) selecting at least one measurement position;

b) calibrating said first sensors by recording at said measurement position, said respective first outputs from each of said first sensors for both an empty arm means and for an arm means lifting and lowering a calibrating weight;

c) subtracting from said respective first outputs recorded from said first sensors for said calibrating weight, the respective first outputs recorded from said first sensors for said empty arm means, at said measurement position, during both the lift and lower portion of the cycle;

d) lifting, emptying and lowering an unknown load and recording said first outputs from each of said front and rear first sensors for each of said lifting and lowering portions of said cycle at said measurement position;

e) subtracting from said output recorded during the lifting portion of said cycle, said output recorded during the lowering portion of said cycle, at said measurement position, to determine a change in output for each first sensor;

f) computing from said change of output at said front and rear first sensors for said unknown weight and said change of output recorded for said front and rear first sensors of said calibrating weight, at said measurement position, the weight of material emptied from said container.

BRIEF DESCRIPTION OF THE DRAWINGS

Reference will now be made, by way of example only, to preferred embodiments of the invention with reference to the following drawings in which:

FIG. 8b is the remainder of the flow chart of FIG. 8a;

FIG. 9 is a flow chart of one of the steps of FIG. 8a;

FIG. 11b the remainder of the flow chart of FIG. 11a.

DETAILED DESCRIPTION OF THE INVENTION

Figure 1:
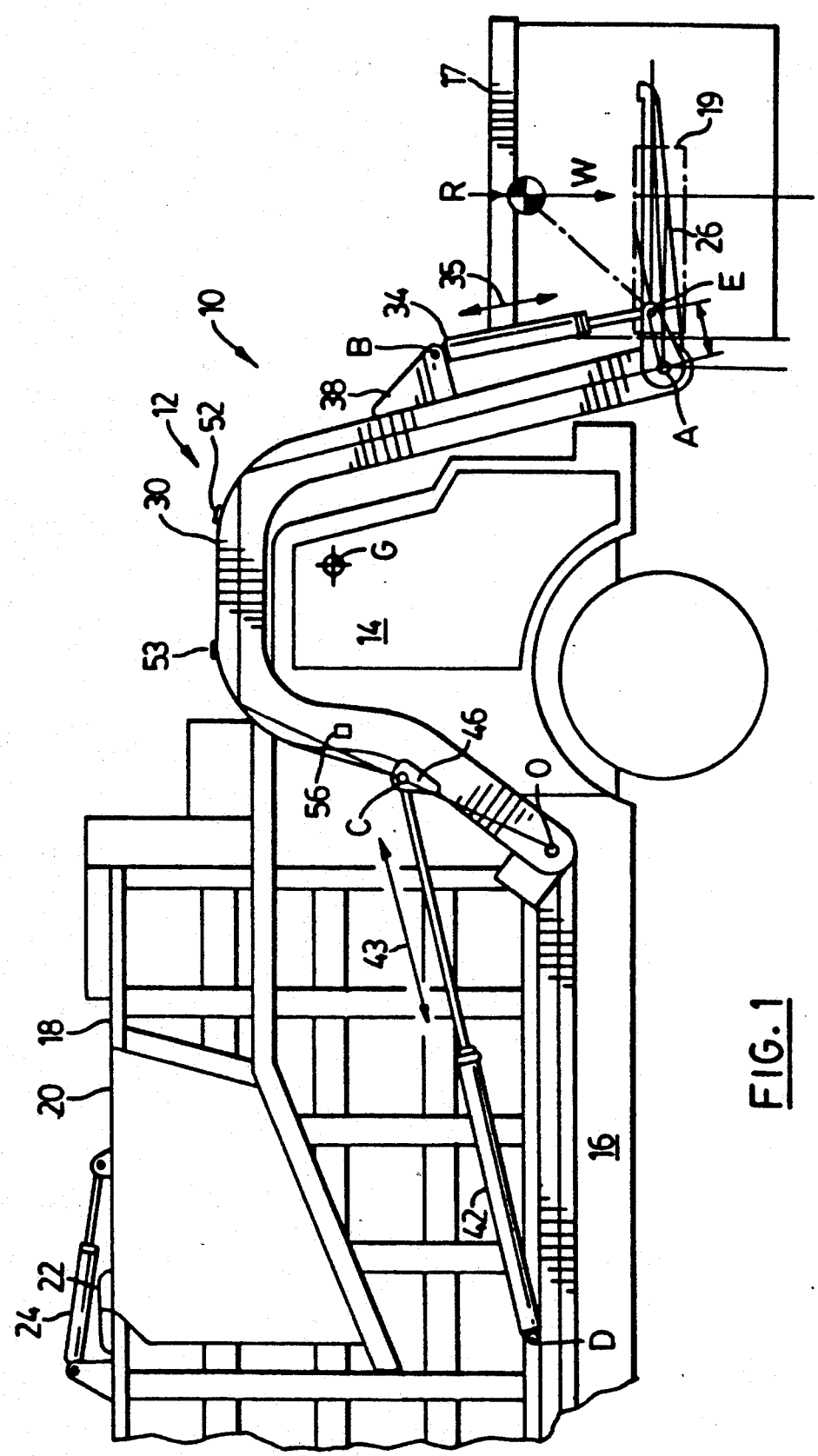
FIG. 1 is a side view of a front end loading refuse truck having a weighing system according to the present invention.

FIG. 1 shows a typical front end loading refuse truck indicated generally with reference numeral 10 having a load-weighing system or apparatus indicated generally as 12 for implementing the method according to the present invention. The truck 10 has a cab 14 and a truck body 16. The truck body 16 carries a receptacle 18 into which refuse containers 17 may be emptied as described below. The receptacle 18 provided with a cover 20 which is attached by hinges 22. A cover hydraulic piston 24 acts between the cover 20 and the receptacle 18 to raise and lower the cover 20 around the hinges 22. The cover hydraulic cylinder 24 may be operable from the cab or may be automatically operated upon operation of the front end loading system, in a known manner. In other cases, the cover 20 may slide, to be opened each day and closed at night.

The load-weighing system 12 is preferably comprised of a number of interacting elements as described herein. The system 12 may be divided into three main categories, namely, the lifting components, which comprise the lift arms and hydraulic cylinders as described below; the data, which comprises constants and measured variables as described below, and a computational unit to translate the data into useful information which comprises circuitry, and a method of calculation embodied in computational algorithm, again, as described below.

Lifting Components

Beginning at the front end FIG. 1 shows a fork arm 26 which is pivotally attached to a generally n-shaped lift arm 30 at pivot point A. In turn, the lift arm 30 is pivotally attached to the main body 16 at a trunnion pivot 0. Acting between the fork arm 26 and the lift arm 30 is a fork hydraulic cylinder 34 which acts as a pivoter to cause fork arm 26 to pivot relative to lift arm 30. The fork hydraulic cylinder 34 is pivotally attached to the fork arm 26 at a pivot E and to a pivot point B on a gusset plate 38, which is in turn attached to the lift arm 30. The fork hydraulic cylinder expands and contracts in the direction of double ended arrow 35. The fork arm 26 is releasably connected to the refuse container 17, usually by being insertable into a lifting slot 19 shown in ghost outline in FIG. 1.

Acting between the lift arm 30 and the truck body 16 is a main lift hydraulic cylinder 42 which also acts as a pivoter to cause lift arm 30 to pivot relative to truck body 16. The main lift hydraulic cylinder 42 is pivotally attached to the truck body 16 at a pivot point D at one end and is pivotally attached to a gusset plate 46 at a pivot point C at the other end. The main lift hydraulic cylinder expands and contracts as indicated by double headed arrow 43. Each of the hydraulic cylinders is similar in operation and are well known in the art. Also shown is G which is the center of gravity of the arm 30 and fork 26 mechanisms, and which is explained in greater detail below, and R which is the center of gravity of the weight being lifted, which is shown as W.

Data: Measured Variables

Also shown in FIG. 1 are some of the variables which are measured and utilized as inputs in the instant invention. According to a preferred embodiment of the instant invention strain readings are taken from at least one forward strain gauge 52 and at least one rear strain gauge 53 which are mounted directly onto the lift arm 30 as shown in FIG. 1. These strain gauges 52, 53 are mounted preferably directly and even bonded onto a load bearing portion of the lift arm 30 to become an integral part of a loadbearing transducer comprised of the strain gauge and the arm itself and are for the purpose of measuring the variable forces in the lifting apparatus which occur during a lifting, emptying and lowering cycle of the refuse container 17.

It is also necessary to measure at least one varying angle, and this angle is noted as which is explained below in reference to FIG. 2. The angle $\beta$ is preferably measured with an inclinometer 56 or a position encoder which provides an output corresponding to the degree of rotation of the arm 30.

Data: Constants

Certain fixed constants are also used in the present invention. The distance from the pivot point 0 to each of gauges 52, 53 on the one arm 30 can be measured, and the distance between the gauges 52, 53 can also be measured. These measurements become the pre-input constants.

Mounting the Gauges

It will be appreciated that there would typically be two arms 30, one on each side of the cab 14. In the preferred embodiment with two arms 30 the front and rear strain gauges 52, 53, would be mounted onto both arms. If there is only one arm 30, such as inside lift trucks, then, of course, only the one arm 30 would have gauges 52, 53

The present invention contemplates mounting the strain gauges directly onto the outer surface of the lift arms 30. The invention does not require that the cross-section of the arms be uniform. Further in the present invention it is not necessary that the gauges 52, 53 be mounted on a plane parallel to the neutral axis of the beam, for the reasons described below. Also, while the Figures indicate that the strain gauges 52, 53 may be mounted on the topsides of the lift arms 30, they may also be positioned around the corners of the more vertical sections, or on the undersides of the lift arms 30. It will also be understood that the present invention is not restricted to n-shaped arms, but that an arm means of any shape which is pivoted at one end and supports a load at the other end can be used. What is required for the present invention is that the force in the lifting apparatus arising from a load on the arm means, be sensed in two places at least.

Figure 3:
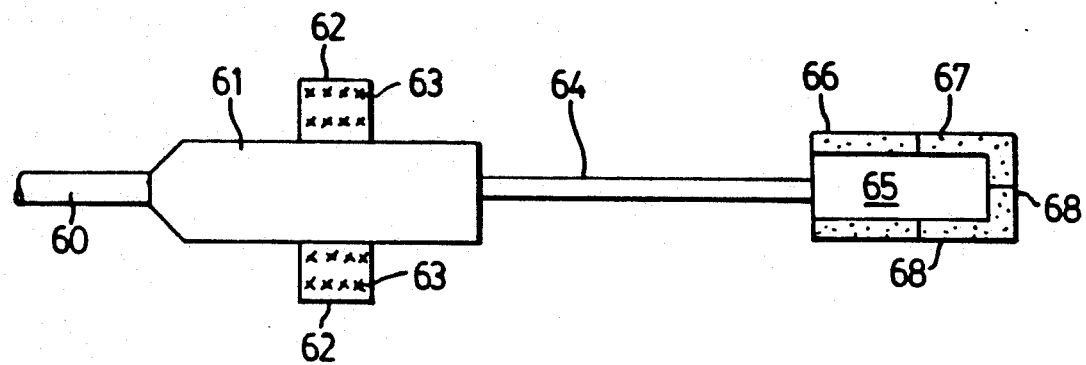
FIG. 3 is a schematic view of a preferred strain gauge used according to the present invention.

FIG. 3 shows a strain gauge model HBW made by Hitec Products, Inc., of P.O. Box 790—Ayer, Mass. 01432 U.S.A. which has yielded good results in the present invention. Shown are an extension cable 60 which ends at a cable transition 61. The cable transition 61 has a pair of hold-down tabs 62, which are applied by tack-welds 63. A transition tube or lead wire ribbon 64 extends to the gauge body 65. The gauge body 65 includes a thin film 66 which is spot welded in place as shown at 67. Alignment marks 68 are used to ensure proper alignment. A glue or bonding agent is also preferred to ensure that the gauge body 65 is integrally fastened to the outer face of the lift arm 30. For good results, the manufacturers installation instructions should be followed.

It is necessary for the two gauges 52, 53 to be separated by a sufficient distance to ensure sufficient difference in strain from front gauge 52 to back gauge 53 to allow any effect of a varying location of a center of gravity of the load, to be removed. Good results have been achieved when the strain gauges 52, 53 are separated by at least,..5 meters. Further, to achieve good results it is desirable to mount the gauges 52, 53 at relatively more compliant portions of the arm 30, and not near or adjacent stiffening plates or the like. Such a location will enhance the output.

Figure 4:
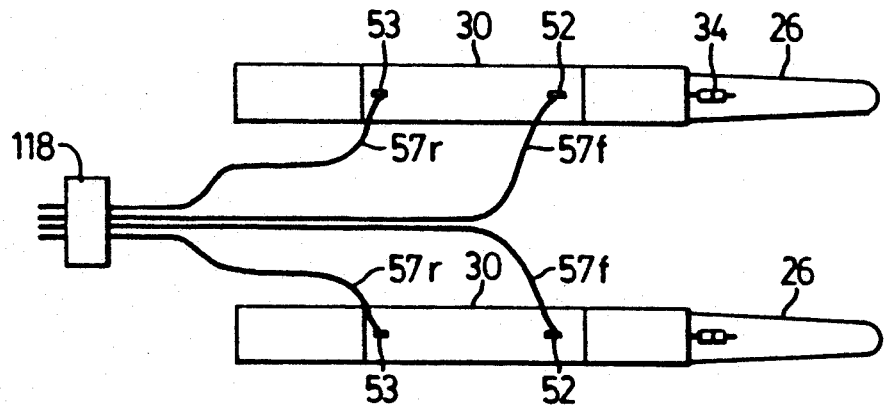
FIG. 4 is a schematic showing wiring according to the present invention.

FIG. 4 shows the pair of lift arms 30, from above, with strain gauges, or first sensors 52, 53 mounted thereupon. Each strain gauge has a separate wire lead, shown as 57f and 57r (for front and rear) leading back to a digital to analog converter 118. 57f and 57r correspond to extension cables 60 in FIG. 3. It will be appreciated that the unit 118 is a means to convert the individual sensor outputs into a form acceptable to the computational unit.

PREFERRED METHOD

In its most general form, the method of weighing of the present invention consists of the following elements, namely, the load arm 30, which may be considered as a beam, fixed or in the preferred embodiment pivoting at one end, at least two strain gauges 52, 53 placed along the beam, and separated by some distance to measure strain in the beam when a concentrated load is placed on the end of the beam, and a concentrated load occurring at any point beyond the location of the two strain gauges 52, 53. With the measured variables and constants, it is possible to determine the actual weight of waste from a waste filled refuse container 17 which is emptied into the refuse truck 10 by using the preferred method.

Prior to detailing the preferred method however, it is necessary to understand some underlying assumptions and geometry. Any load on the arms 30 will be related to the strain measured at any given location of the arm 30. In the preferred method certain assumptions are made about the nature of the forces and moments in the arm 30 as explained below.

Figure 2:
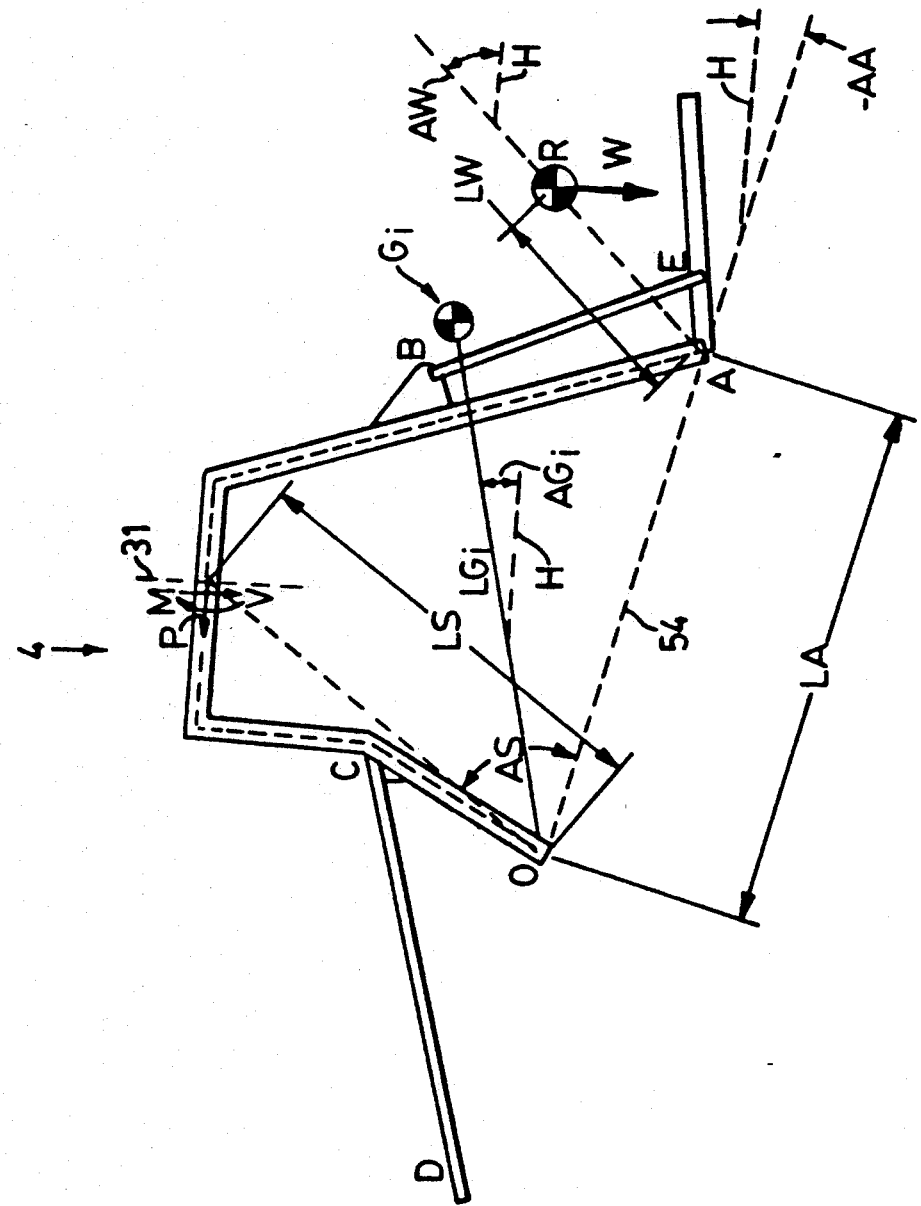
FIG. 2 is a free body diagram of the weighing system of FIG. 1.

In FIG. 2 a portion of the arm 30 is isolated and put in equilibrium by a cut 31. The location of the cut 31 is identified with parameters LS and AS. In this case LS is the distance from point 0, the pivot point, to the cut 31, and AS is the angle between LS and a projection line 54 joining 0 and A. The preferred section of the arm 30 to make the cut 31 is between B and C along arm 30. In this part of the arm 30 may be considered as the sensing portion. For accurate results, it will be appreciated that no portion of the forces created by the load W, bypass this sensing portion of the arm.

Another variable necessary is the angle between the plane of the cut 31, and vertical. $\beta$ is zero in FIG. 2, and for the purpose of the following description is positive in a counterclockwise direction.

It is also necessary to include the weight of the lift arms and fork arms outboard of the cut 31. Thus, Gi is the weight of the arms and other components of the lifting apparatus outboard of the cut 31, LGi is the distance to the center of gravity of the outboard apparatus from 0 and AGi is the angle that LGi makes with a horizontal plane. Note that the subscript i is used as a generality and that this analysis will apply in particular to each strain gauge mounted on arm 30. Therefore, $$\text{Moment } i = -W[LW \cos(AW) + LA \cos(AA) - LSi \cos(ASi)] - (Gi)(LGi) \cos(AGi) \quad (1)$$

$$\text{Shear } i = -[W + Gi] \cos(\beta) \quad (2)$$

$$\text{Tensile } i = -[W + Gi] \sin(\beta) \quad (3)$$

where, LW equals the distance between R and pivot point A; AW equals the angle between LW and a fixed plane, such as horizontal (shown as H in FIG. 2.);

LA equals the distance between point 0 and point A in FIG. 2; and

AA equals the angle between OA and a fixed plane such as horizontal (shown as H in FIG. 2) and is positive in a counterclockwise direction;

Equations (1), (2) and (3) show the portions of the internal forces in arm 30 caused by the weight of the refuse are a linear function of the applied loads or weight of the refuse. Essentially three factors support the linear relationship between strain and weight: Firstly, shear loading does not affect the strain at the surface of the arm; secondly, the moment loading, and thus the moment stresses increase as the distance from the load increases (and they will be relatively large); and thirdly, the stresses due to tensile loading do not increase with distance from the load and are small due to the fact that measurements can be made through angles in which these loads are small, as they are a function of Sin (AA). Thus the present invention assumes that the stresses in the arm are only due to moment loading in the arm. Thus strain measured by gauges 52 and 53 will be proportional to both the load and the horizontal distance from the strain gauges to the center of the mass.

In the following, strain gauge 52 could be represented by i 1 and strain gauge 53 could be represented by i = 2 for example.

Denote the horizontal distances from gauge i the center of gravity of load W at R, as $L_{ci}$ where i is the number of the strain gauge. From equation (1):

$$L_{ci} = LW \cos(AW) + LA \cos(AA) - LS_i \cos(AS_i) \quad (4)$$

The equations relating the measured strain to the load and distance to the center of mass of the refuse and to the weight of the arm can be written as:

$$\epsilon_1 = K_{1w} W L_{c1} + K_{1G} G1 \quad (5)$$

$$\epsilon_2 = K_{2w} W L_{c2} + K_{2G} G2 \quad (6)$$

Where $\epsilon_i$ is the strain measured by gauge i, W is the weight of the bin, Gi is the weight of the arm mechanism between gauge i and the end of the arm, and the K values are calibration constants.

To determine the weight of the refuse in the bin the following method is preferred, which involves two steps, namely, a calibration step and a measurement step. (A) Calibration. In the preferred embodiment it is necessary to calibrate the load weighing system, for two primary reasons. Firstly, the arm will produce different strain readings at different angles of rotation about the pivot point, and secondly, the different strain gauge locations will give different linear calibration constants with respect to W since the lengths are different and the arm may be non-uniform (non-uniform arm structures can be easily accommodated provided the strain is in some proportional relationship to a variable W).

Calibration for these two effects can be accomplished by completing at least one lift and lower cycle of a known weight and center of mass (a calibration weight) and at least one lift and lowering cycle using no weight respectively. The removal of values of these calibrations outside normally acceptable statistical limits further improves the reliability of the calculations. Using sensors mounted on both lift arms 30 also increases the accuracy of the readings by providing a comparison value which allows averaging of left and right outputs if they are sufficiently close.

It is necessary to identify at least one measurement position of the arm 30 at which all recordings of output are made so that they can be compared and used to compute a weight. In the preferred embodiment a continuous stream of readings are taken during calibration and measurement during both the lift and lower cycle. It is preferred to restrict the range over which the output is used for weight calculations however. Good results have been achieved with the arm 30 in a range of 7° to 22° to a horizontal plane. Continuously recording each gauges output over a defined range of angles, as a function of said angle, allows a plurality of readings to be obtained which can increase the likelihood of accuracy of the readings, by allowing spurious data points to be ignored.

After installing the strain gauges 52, 53 a calibration procedure is performed to determine values for the constants $K_{1w}$, $K_{2w}$, $K_{1G}$, $K_{2G}$ and each of these four constants will be functions of the angle of tilt of the arm with respect to a fixed plane, like vertical (i.e. functions of angle $\beta$). The absolute values of $K_{1G}$ and $K_{2G}$ do not need to be explicitly determined. An empty arm lift (with no extra weight) will determine the values of $K_{1G}^* G1$ and $K_{2G}^* G2$ as functions of angles for calibration purposes. In order to find $K_{1w}$ and $K_{2w}$ a lift of known weight with known center of mass position can be performed. This will be referred to as the calibrating weight or known weight. The results of the empty arm lift and the calibrating weight lift are combined to complete calibration, as explained below in more detail. The location of the center of mass can either be calculated or measured as desired. Subtracting these values from the measurements for the lifting of the known weight will yield in values of $K_{1w}^* W^* L_{c1}$ and $K_{2w}^* W^* L_{c2}$. Since the weight W and the horizontal distances $L_{c1}$ and $L_{c2}$ are known (or can be easily measured) the parameters $K_{1w}$ and $K_{2w}$ as functions of angle can be calculated. For greater accuracy multiple tests using a range of W (around the expected loads of operation) may be performed and the results suitably combined.

(B) Measurement. The measurement procedure is similar to the calibration procedure. The refuse bin 17 is lifted, emptied into the truck and then lowered. During the lifting and lowering motions the individual electrical output from each strain gauge is separately measured and recorded as function of the angle $\beta$. The difference between the lifting and dropping values of each output is proportional to the strain due to the weight of refuse emptied from the bin and the horizontal distances from each of the gauges to the center of mass of the load. Since the exact locations of each of the strain gauges 52, 53 is known, the horizontal distance between the gauges can be determined.

$$L_{c1-2} = L_{c1} - L_{c2} \quad (7)$$

In this sense $L_{c1-2}$ is the horizontal distance between the gauges. The * superscripts on the strains indicate that these values are the differences between the lifting and dropping values, so $$\epsilon_1^* = \epsilon_{1,lifting} - \epsilon_{1,dropping} = K_{1w}WL_{c1} \quad (8)$$

and $$\epsilon_2^* = \epsilon_{2,lifting} - \epsilon_{2,dropping} = K_{2w}WL_{c2} \quad (9)$$

Solving the three equations (7), (8) and (9) simultaneously we find that:

$$W = \frac{K_{2w}\epsilon_1^* - K_{1w}\epsilon_2^*}{K_{1w}K_{2w}L_{c1-2}} \quad (10)$$

(where these values are noted as a function of angle $\beta$). Once W is found the distances from the two strain gauges to the center of mass of the refuse could be calculated:

$$L_{c1} = \frac{\epsilon_1^* K_{2w}L_{c1-2}}{K_{2w}\epsilon_1^* - K_{1w}\epsilon_2^*} \quad (11)$$

and $$L_{c2} = \frac{\epsilon_2^* K_{1w}L_{c1-2}}{K_{2w}\epsilon_1^* - K_{1w}\epsilon_2^*} \quad (12)$$

However, in the embodiment of the invention it will be understood that determining the location of the center of gravity of the load is an unnecessary step.

Figure 6:
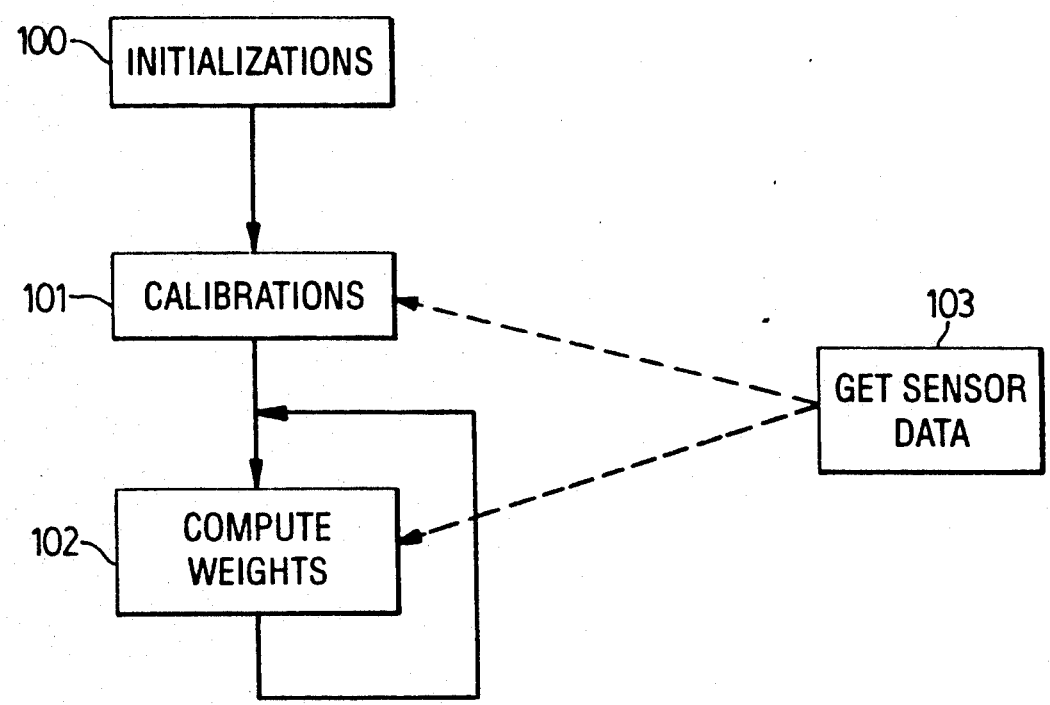
FIG. 6 is a flow chart of algorithm for a main program for implementing the present invention.

FIG. 6 is a flow chart which depicts one algorithm for implementing this invention. Shown in FIG. 6 are the steps of Initializations 100, Calibrations 101, Compute Weights 102, and Get Sensor Data 103. As shown in the attached pseudo code in Appendix I a number of tasks could operate simultaneously; through multi-tasking, such as Read Sensor task; Capture weight data task; Compute calibration task; and Weight task. The flow chart of FIG. 6 reduces the number of tasks down to two. The Read Sensor task and the Capture weight data have been combined in the Get Sensor Data task 103. This task 103 can be viewed as a timer interrupt routine. The main program consisting of steps 100 to 102 incorporates the remaining tasks as shown in the pseudo code.

Figure 7:
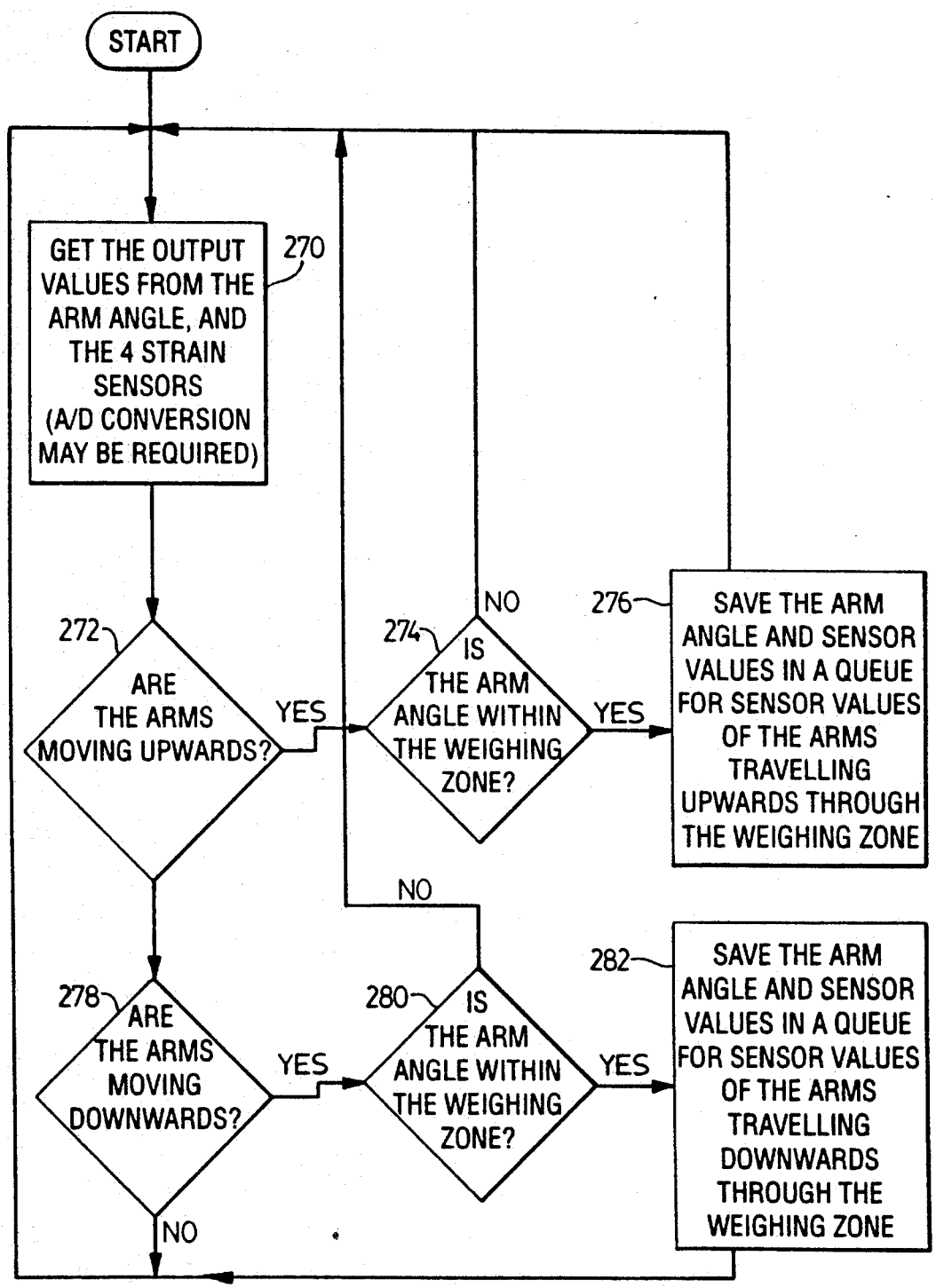
FIG. 7 is a flow chart of one of the steps of FIG. 6.

The Get Sensor Data task 103 may be as represented in a flow chart in FIG. 7. Task 103 processes one set of sensor values at a time. In step 270, the sensors values are read. If these values are read in analog form it may be necessary to convert to the digital equivalent of the analog sensor outputs. If lift arms 30 are moving up, the condition in step 272 is satisfied and the angle of arm 30 is then checked to determine whether it is within the preferred weighing zone which may be defined as $\beta$ being from 7 degrees to 22 degrees. If the latter condition is also true, these sensors values are saved in a queue. Steps 278 to 282 are for handling the case when the arms are moving downward. These are similar to steps 272 to 276. However, this time, the sensors data may be stored in a second queue.

Once a set of sensors values have been processed, another set is fetched and the above operation repeats.

The main program begins with the Initializations routine 100. In this routine 100, system diagnostics and variable initializations are performed.

Figure 8A:
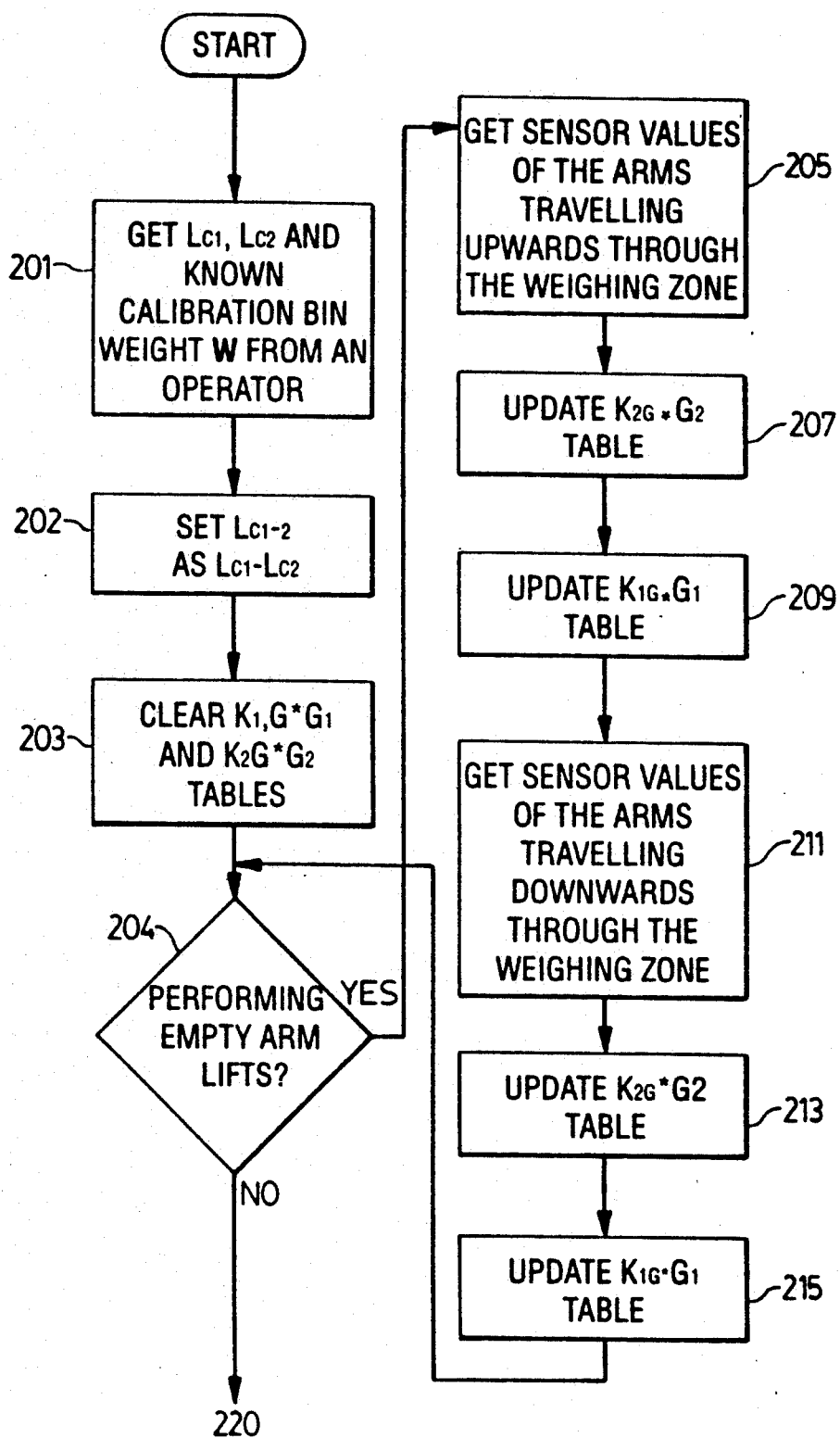
FIG. 8a is a partial flow chart of one of the steps of FIG. 6.

In step 101, calibration of the load weighing apparatus is performed. A more detailed flow chart of this routine is shown in FIG. 8a. After steps 201 and 202, this routine 101 can be divided into 2 sections. The first section consisting of steps 204 to 215, is for performing empty arm lift. This section creates two tables $K_{2G}^*G2$ and $K_{1G}^*G1$. These two tables are used in the second section to derive two other tables: $K_{12}$ and $K_{2w}$. The latter two calibration tables are used by the Compute Weights routine 102 to determine weight emptied from container 17.

Most steps in the Calibration routine 101 are self-explanatory, but some of these steps are explained below. In step 205, sensors values are obtained from the first queue created by the Get Sensor Data task 103 described above. This step 205 fetches all the data from the first queue consisting of sets of sensor values. Steps 207 and 209 then operate on these sets to derive tables $K_{2G}^*G2$ and $K_{1G}^*G1$. The $K_{2G}^*G2$ and the $K_{1G}^*G1$ tables are the calibration tables for the pairs of rear and front sensors, respectively. Steps 211 to 215 are identical to steps 205 to 209 except that the data are obtained from the second queue created by the Get Sensor Data task 103.

Figure 9:
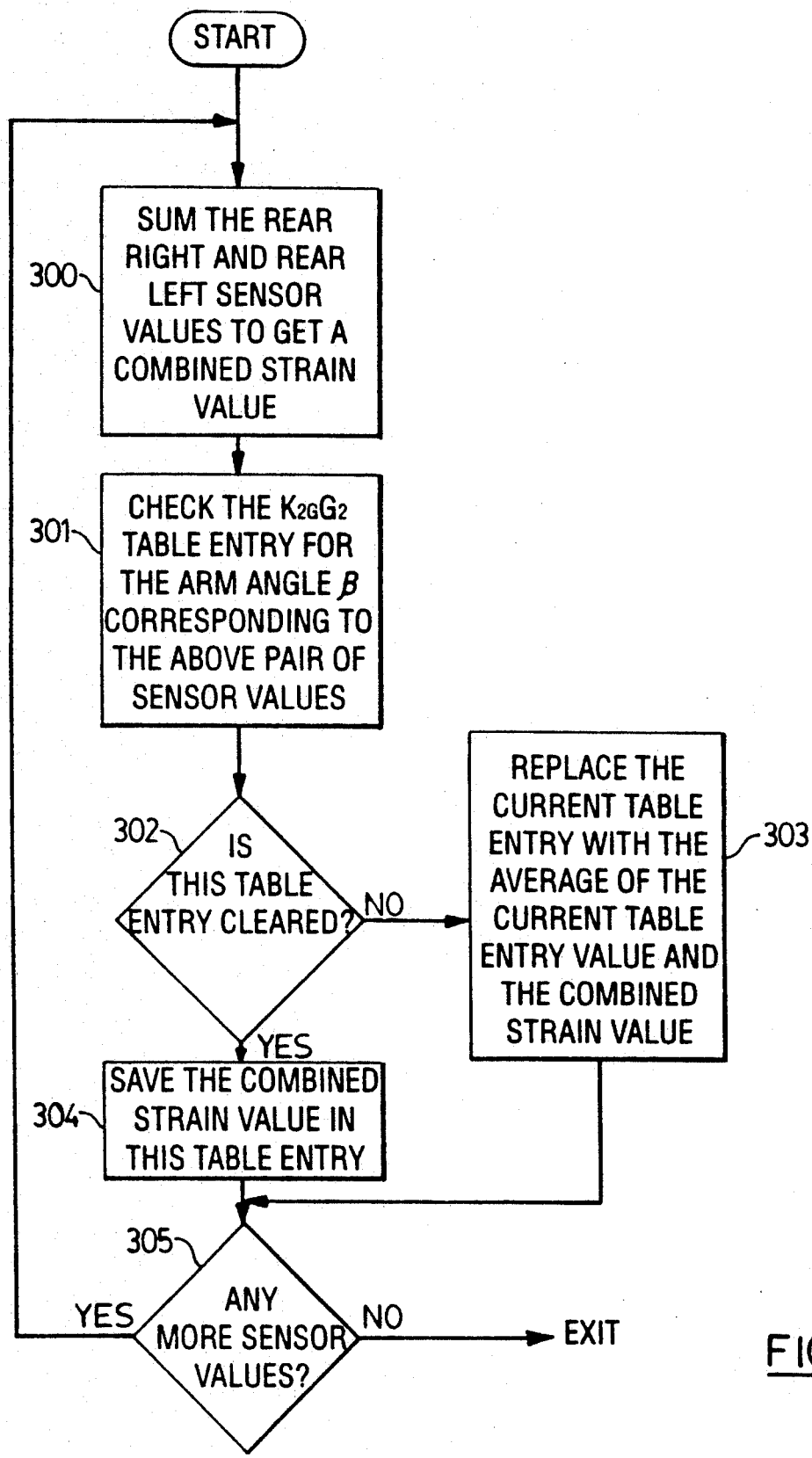

A flow chart of step 207 is shown in FIG. 9. In step 300, the rear right and rear left sensors values are summed to obtain a combined strain value, $\epsilon_{2,lifting}$, for a particular arm angle $\beta$. If the table entry for this angle $\beta$ is cleared, the combined strain value is saved in this table entry in step 304. Otherwise, the current value of this table entry is averaged with this combined strain value to form the new value for this entry as shown in step 303.

The above operation repeats for the remaining sets of sensors values.

The flow chart for step 213 is identical to the flow chart for step 207 except that the combined strain value corresponds to $\epsilon_{2,dropping}$.

The flow chart for steps 209 and 215 are very similar to steps 207 and 213 described above. For steps 209 and 215, the front sensors values are used and the K1G*G1 table is being updated. In step 209, the combined strain value corresponds to $\epsilon_{1,lifting}$. In step 215, the combined strain value corresponds to $\epsilon_{2,dropping}$.

Figure 8B:
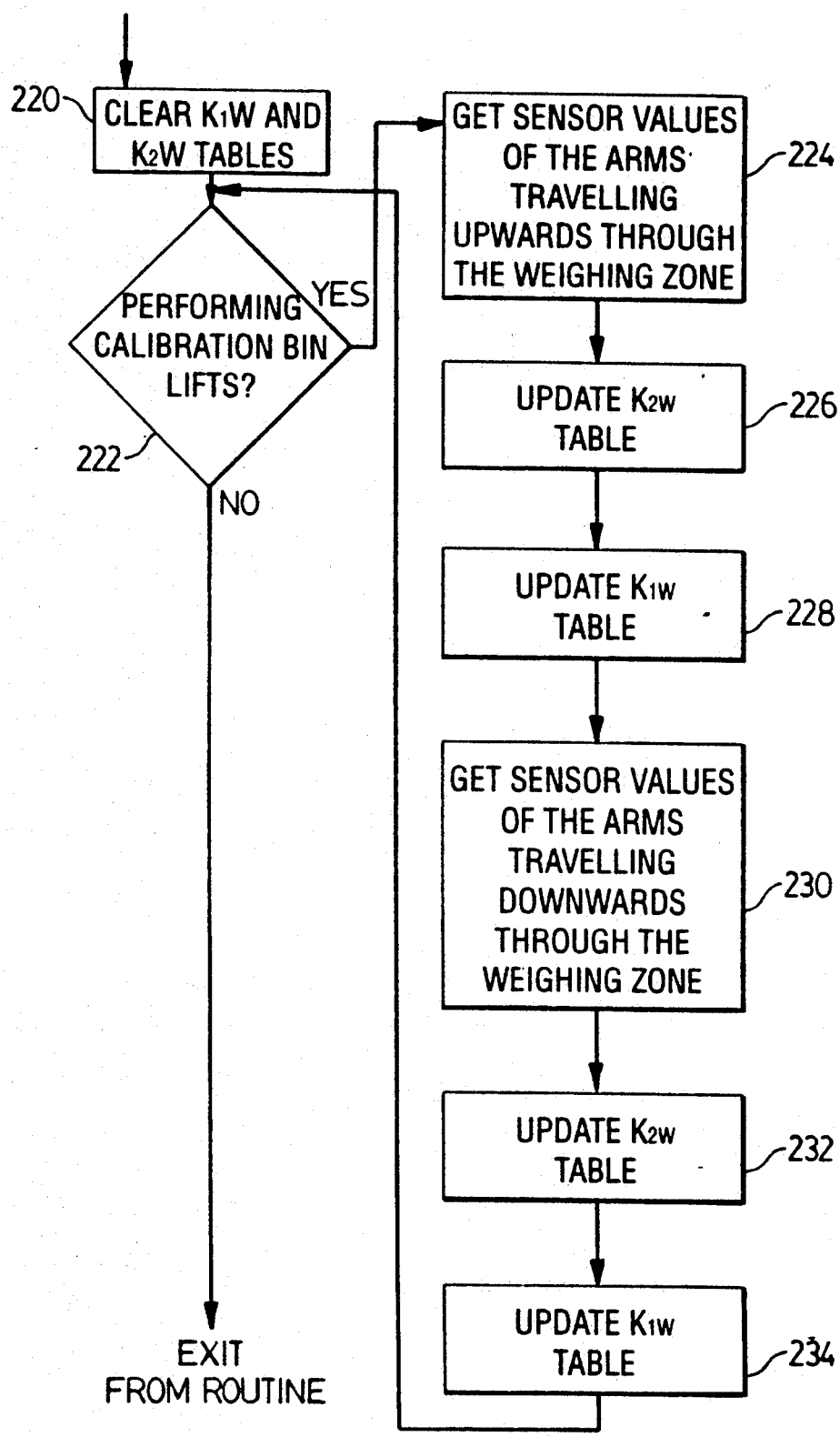

The second section of the Calibration routine 101 consisting of steps 220 to 234 as shown in FIG. 8b, is to derive two more calibration tables when the lift is lifting a known or calibrating weight W. Steps 220 to 234 are very similar to steps 203 to 215. However, the calculations to derive these two tables found in steps 226, 228, 232, and 234 are somewhat different.

Figure 10:
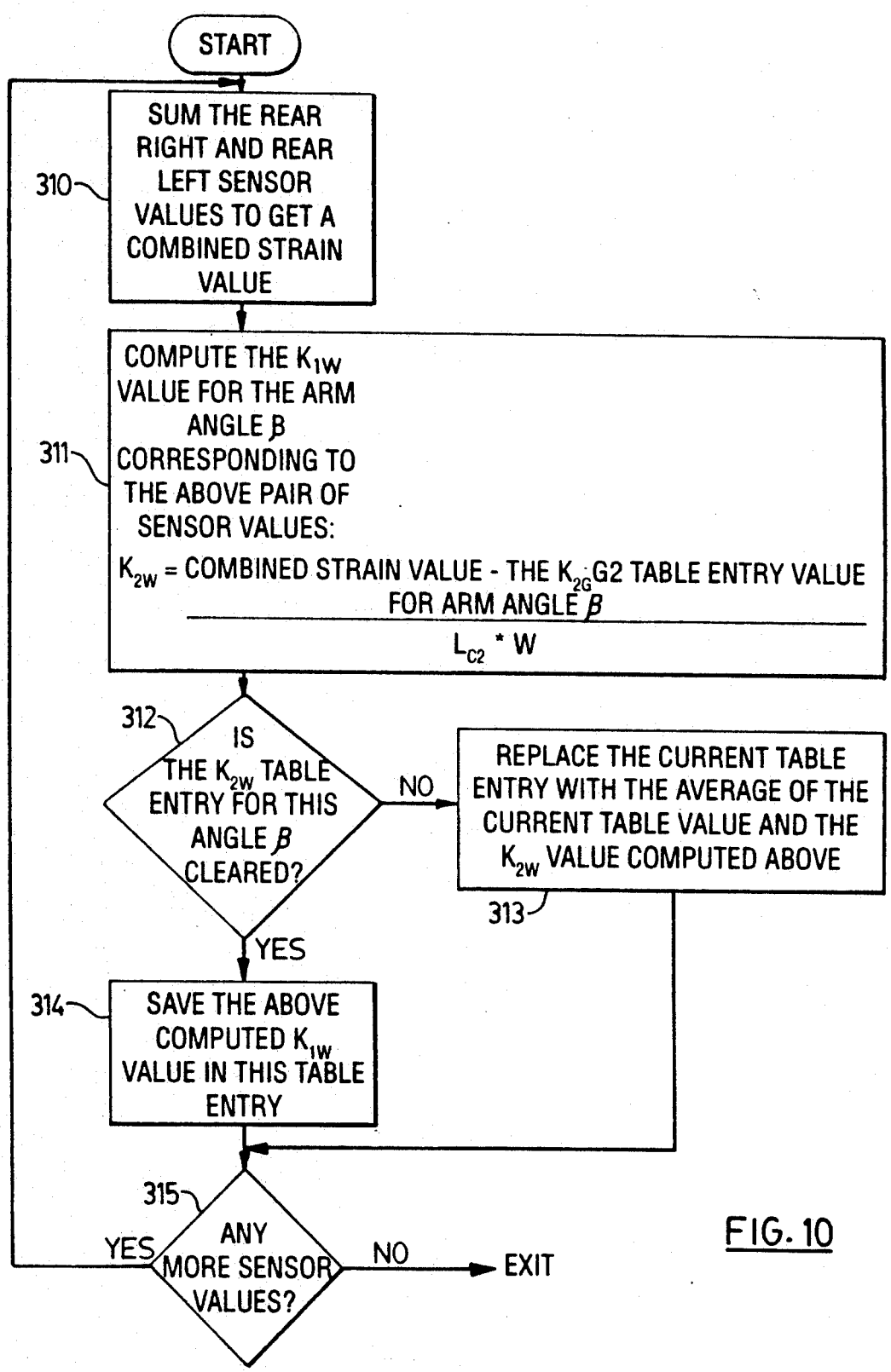
FIG. 10 is a partial flow chart of one of the steps of FIG. 8b.

A flow chart of step 226 is shown in FIG. 10. In step 310, the rear right and rear left sensors values are summed to obtain a combined strain value. This latter value corresponds to $\epsilon_{2,lifting}$. The $K_{2w}$ value for a particular arm angle is determined by the equation shown in step 311. If the $K_{2w}$ table entry for this angle $\beta$ is not cleared, step 313 will be executed. This step 313 averages the existing table entry value with the newly calculated $K_{2w}$ value. Otherwise, the newly calculated $K_{2w}$ value is saved directly into the table.

The steps 310 to 315 repeat for any sets of sensors values which remain to be processed.

Step 232 is identical to step 226 except that the combined strain value there corresponds to $\epsilon_{2,dropping}$ instead. As shown in FIG. 8b, steps 228 and 234 update the $K_{1w}$ table and are similar to steps 226 and 232, respectively. For steps 228 and 234 the front sensors values, the $K_{1G}*G1$ table and $L_{c1}$ are used instead of the rear sensors values, the $K_{2G}*G2$ table, and $L_{c2}$, respectively.

Figure 11A:
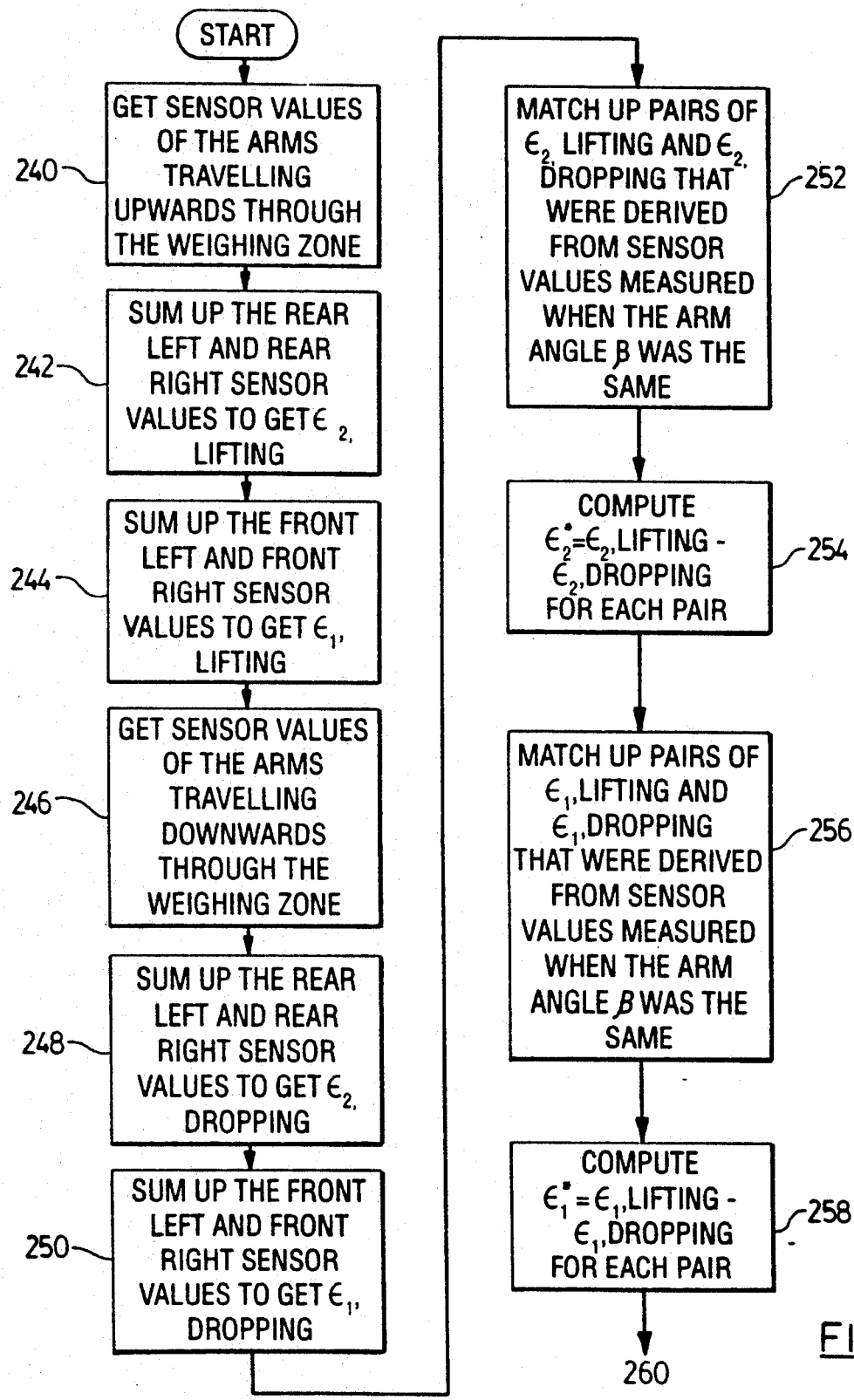
FIG. 11a is a flow chart for one of the steps of FIG. 6.
Figure 11B:
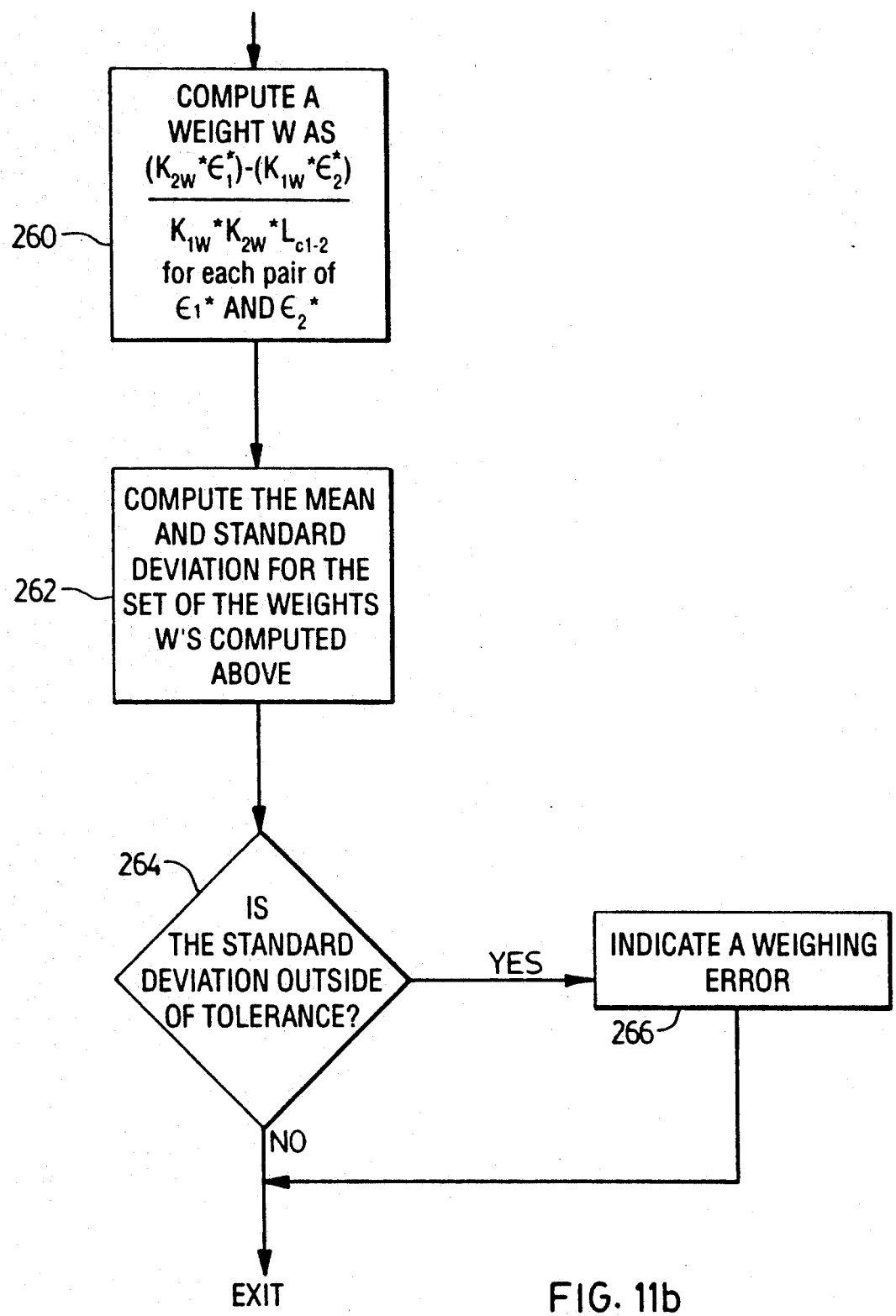

A flow chart of the Compute Weights routine 102 is shown in FIG. 11a and 11b. Steps 240 to 250 compute $\epsilon_{1,lifting}$, $\epsilon_{1,dropping}$, $\epsilon_{2,lifting}$, and $\epsilon_{2,dropping}$ for a range of (through the preferred weighing zone) arm angle $\beta$ values. In step 205, $\epsilon_{2,lifting}$, and $\epsilon_{2,dropping}$ are matched up according to their corresponding arm angle $\beta$. For instance, the $\epsilon_{2,lifting}$ for an angle of 15 degrees is paired with the $\epsilon_{2,dropping}$ for an angle of 15 degrees. Step 254 operates on these pairs to compute a set of $\epsilon_2^*$. Steps 256 and 258 which calculate a set of $\epsilon_1^*$ are analogous to steps 252 and 254. In step 260, a weight W is calculated for each $\epsilon_1^*$ and $\epsilon_2^*$ using the equation shown there. For instance, if the pair of $\epsilon_1^*$ and $\epsilon_2^*$ corresponds to an arm angle $\beta$ of 15 degrees, the entries from the tables $K_{1w}$ and $K_{2w}$ that correspond to this angle $\beta$ will be used in the computation.

In step 262, the calculated set of weights W for the range in values of arm angle $\beta$ will be averaged to determined to final weight value. A standard deviation is also calculated. This deviation value is used to determine whether the distribution of weight is within acceptable limits in step 264. The error routine in 266 handles any unacceptable sets of W values.

Appendix I shows a preferred pseudo code for implementing the preferred method generally described above.

On-Board Circuitry

Figure 5:
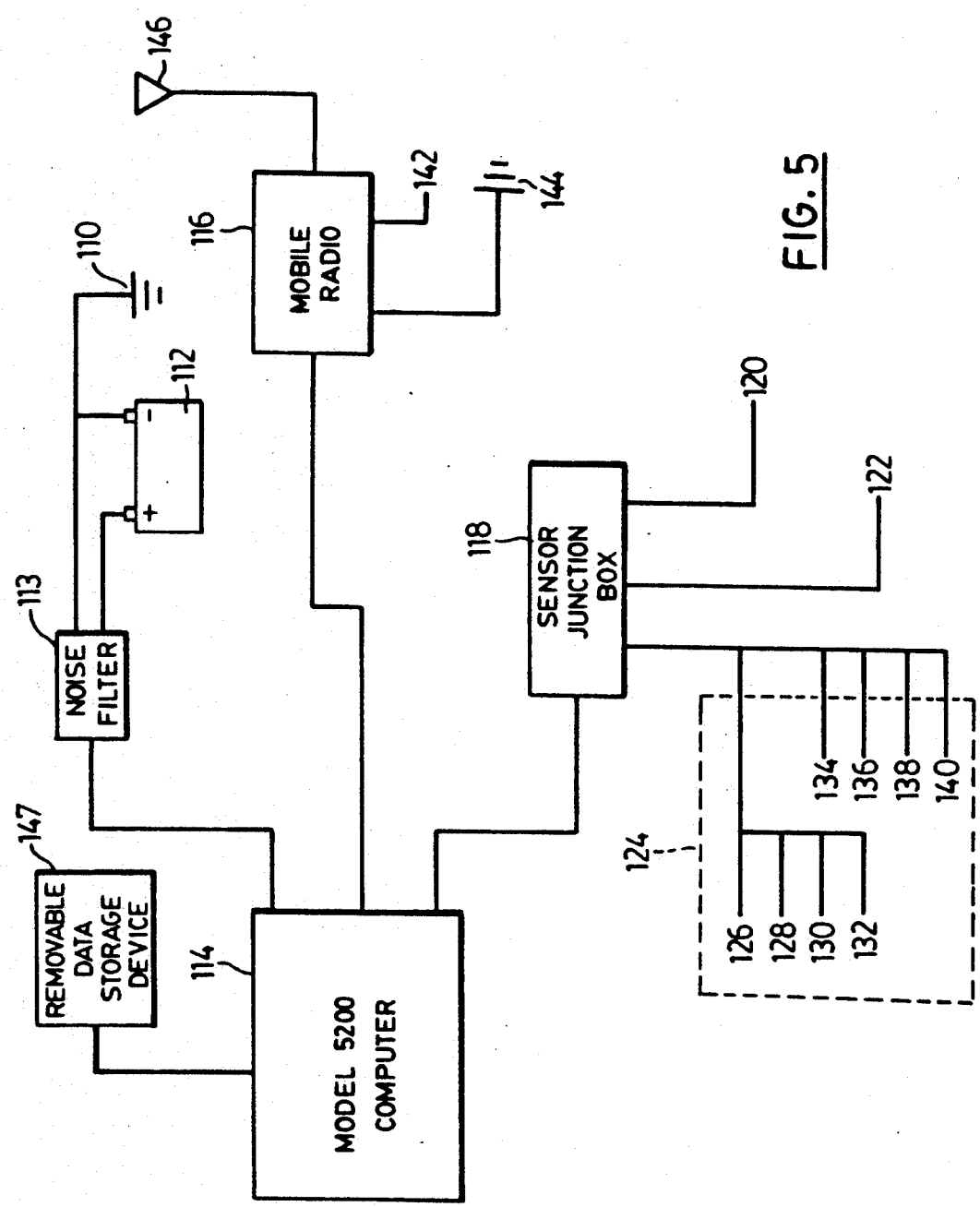
FIG. 5 is a schematic of circuitry according to the present invention.

Turning now to FIG. 5, there is shown a schematic diagram of the on-board circuitry according to the present invention. FIG. 5 shows a ground 110 and a battery 112. Both positive and negatives leads from the battery 112 pass through a noise filter 113 prior to powering a computational unit or computer 114. The computer has several input and output ports which can be utilized to input and/or extract weight, sensor and other information from the truck. One output port leads to a mobile radio 116. Another output port leads to a removable data storage device 147. An input port takes input from a sensor junction box 118. The sensor junction box in turn has a number of inputs as described herein. Input 120 may be for example the vehicle speed, input 122 may be for example the vehicle fuel level. Dashed lines 124 indicate the measured inputs preferred for weight reading system. The inputs 126 and 128 are the strain readings on the lift and return portions of one of the main arm 30 cycles from gauges 52, 53 respectively. The measured inputs 130 and 132 are the strain readings taken on the lift and return sides of the other main arm 30 from gauges 52, 53. Inputs 136, 138 and 140 may be used as needed for redundancy back-up. The measured input 134 is $\beta$, the measured angle of the main lift arms 30.

In the described system, the battery 112 is preferably the vehicle battery. However, mobile radio 116 is preferably equipped with its own 12 V battery 142 to avoid draining the vehicle battery 112. The mobile radio 116 is therefore provided with its own separate ground 144. The mobile radio 116 is also equipped with an antenna 146. The lines running into the sensor junction box are preferably two-channel lines, and the sensor junction box is preferably attached to the computer 114 with a 28-channel line. The connection with the mobile radio is preferably a 5-channel line. A removable data storage device 147 may also be used.

Some of the advantages of the instant invention can now be appreciated. For example, in the preferred embodiment, weight readings are not measured and calculated on the lift cycle, nor are they calculated for the lower cycle. To do so would require separate calibration of the zero point of the strain gauges 52, 53 prior to every lift. Rather this embodiment relies upon recording a set of up cycle measurements from the gauges, and a set of down cycle measurements from the same gauges, and using the difference between the up and down sets of measurements to derive a set of differential strain readings. The set of differential strain readings are then compared to a set of calibration curves obtained from the very same equipment and combined with the measured and derived (as a function of angle $\beta$) distances between the gauges to calculate the weight of the container contents that was emptied into the truck.

It can also be understood that through the use of the instant method, which incorporates a calibration procedure and separate recordal of strain from each gauge, the gauges can be mounted directly onto the outside of the arm, without the need for special machining of a plane parallel to the neutral axis of the arm, nor an arm with an exactly uniform response along its measuring length. Separate measurement and recordal of strain, together with calibration as aforesaid means that any local anomalies can be accurately accommodated and compensated for with a minimum of physical alteration to the lift arms 30.

It will now be appreciated that the present invention provides a simple yet practical way to measure loads from conventional equipment, without requiring modification. While the foregoing discussion has focused on n-shaped lift arms 30, it will be appreciated that any shape of arm means can be used, providing that the arm means is cantilevered, and for a portion of its travel, contains a section with measurable strain in at least two locations in response to an unknown load placed at its end.

It will also be appreciated that the foregoing description relates to strain gauges, but other sensors will also be appropriate, providing that their output is proportional to the load applied to the arm means. The strain gauges of this invention measure the change in length over length of the arm means, when loaded. Thus, these gauges measure the deformation of the arm means under loading. Other devices for measuring such deformation include, extensionmeters which may be defined as devices which employ a system of levers to amplify minute strains to a level where the strains, or deformation can be read, linear variable differential transformers which produce an output signal amplitude proportional to strain, acoustical deflection sensing devices where the time or phase delay in an acoustical wave travelling along a body is proportional to strain, optical deflection sensing devices that use interference fringes produced by optical flats to measure strain, vibrating beam devices where the frequency of vibration of the sensor's beam is a function of the strain imparted to the sensor's internal beam which is in turn affixed to the body that is subjected to strain.

The basis of the preferred invention is to have output from a sensor which is proportional to the force, and indirectly to the weight, to which the measured body, such as the arm means, is being subjected to.

It will be appreciated by those skilled in the art that various modifications to the instant invention can be made, which still fall within the scope of the claims. Some of these variations have been suggested above, and others will be apparent to those skilled in the art. However, the important aspect of the instant invention is the separate recording of output from at least two sensors for at least one lift arm 30 and preferably both lift arms 30, whereby reasonably accurate weight measurement can be obtained, through proper calibration and computational algorithms.

APPENDIX I

1) This appendix describes, through use of pseudo-code, preferred algorithms for implementation of the present invention. In the preferred embodiment referred to in the pseudo code below there are four first sensors in total, comprising two strain gauges 52, 53 (front, rear) placed on each one of two arms 30 (left, right).
2) Pseudo Code
2.1) Sensor Readings
   The following procedures preferably execute continuously on the computational unit or computer. This provides a constant stream of sensor readings for use in calibration and weight computations. The GET SENSOR READINGS procedure sums a set of successive readings in order to average or "smooth" the data.
2.1.2) TASK READ SENSORS
   FOR EVER
   Select ARM ANGLE Analog Input
   PERFORM GET SENSOR READING
   Queue ARM ANGLE digital value
   Select REAR LEFT Analog Input
   PERFORM GET SENSOR READING
   Queue REAR LEFT digital value
   Select REAR RIGHT Analog Input
   PERFORM GET SENSOR READING
   Queue REAR RIGHT digital value
   Select FRONT LEFT Analog Input
   PERFORM GET SENSOR READING
   Queue FRONT LEFT digital value
   Select FRONT RIGHT Analog Input
   PERFORM GET SENSOR READING
   Queue FRONT RIGHT digital value
   END FOR
2.2) Weight Data
   The following procedure is preferably used to capture a set of sensor readings, namely output, to be used for either a calibration lift or a weight computation. This procedure collects a set of readings or output taken as the arm travels upwards through the weighing zone and another set as the arm travels back downwards through the weighing zone. The weighing zone is defined as the range of angles of β which are preferred measurement positions.
2.2.1) TASK CAPTURE WEIGHT DATA
   Set Weigh Zone to be in the preferred embodiment in the range of 7 to 22 degrees between a generally horizontal part of the arm means 30 and a horizontal reference plane:
   FOR EVER
   Dequeue ARM ANGLE digital value
   Dequeue REAR LEFT digital value
   Dequeue REAR RIGHT digital value
   Dequeue FRONT LEFT digital value
   Dequeue FRONT RIGHT digital value
   WHILE ARM ANGLE is travelling upwards through Weigh Zone Collect ARM ANGLE, REAR LEFT, REAR RIGHT, FRONT LEFT, FRONT RIGHT digital values
   END WHILE
   WHILE ARM ANGLE is travelling downwards through Weigh Zone Collect ARM ANGLE, REAR LEFT, REAR RIGHT, FRONT LEFT, FRONT RIGHT digital values
   END WHILE
   Queue UP and DOWN digital values

-continued
APPENDIX I

END FOR
2.3) Calibration
   The following procedures are preferred and are used to calculate different calibration curves. These calibration curves are used to identify the strains, or sensor outputs, as functions of ARM ANGLE. Both the up and down portions of the lift are used to establish the curves. The LEFT and RIGHT sensor pairs are summed together to provide separate REAR and FRONT calibration curves. An empty arm lift is used to produce the REAR and FRONT EMPTY ARM CURVES. A calibration or known weight is used to produce the REAR and FRONT CALIBRATION curves. Multiple lifts (minimum of 3) are preferred to "average" the data in the curves.
2.3.1) PROCEDURE COMBINE STRAIN
   FOR each reading in set
   Sum LEFT and RIGHT digital values
   END FOR
2.3.2) PROCEDURE SET EMPTY ARM CURVE
   FOR the set of LEFT and RIGHT digital values
   PERFORM COMBINE STRAIN
   END FOR
   FOR the set of ARM ANGLE and combined strains
   IF ARM ANGLE table entry clear THEN
   Insert combined strains into table
   ELSE
   Average combined strains into table
   END IF
   END FOR
2.3.3) PROCEDURE SET REAR CALIBRATION CURVE
   FOR the set of LEFT and RIGHT digital values
   PERFORM COMBINE STRAIN
   SUBTRACT K1G*G1 curve value from combined strain
   END FOR
   FOR the set of ARM ANGLE and combined strains
   Compute K1Wi from LC1 and W
   IF ARM ANGLE table entry clear THEN
   Insert K1Wi value into K1W table
   ELSE
   Average K1Wi value into K1W table
   END IF
   END FOR
2.3.4) PROCEDURE SET FRONT CALIBRATION CURVE
   FOR the set of LEFT and RIGHT digital values
   PERFORM COMBINE STRAIN
   SUBTRACT K2G*G2 curve value from combined strain
   END FOR
   FOR the set of ARM ANGLE and combined strains
   Compute K2Wi from LC2 and W
   IF ARM ANGLE table entry clear THEN
   Insert K2Wi value into K2W table
   ELSE
   Average K2Wi value into K2W table
   END IF
   END FOR
2.3.5) TASK COMPUTE CALIBRATION
   Enter measured values LC1 and LC2
   Enter known calibration bin weight W
   Compute LC12 as LC1 - LC2
   Clear K1G*G1 table
   Clear K2G*G2 table
   WHILE doing EMPTY ARM LIFTS
   Dequeue UP digital values
   USING REAR LEFT, REAR RIGHT, ARM ANGLE and K1G*G1 table
   PERFORM SET EMPTY ARM CURVE
   USING FRONT LEFT, FRONT RIGHT, ARM ANGLE and K2G*G2 table
   PERFORM SET EMPTY ARM CURVE
   Dequeue DOWN digital values
   USING REAR LEFT, REAR RIGHT, ARM ANGLE and K1G*G1 table
   PERFORM SET EMPTY ARM CURVE
   USING FRONT LEFT, FRONT RIGHT, ARM ANGLE and K2G*G2 table
   PERFORM SET EMPTY ARM CURVE
   END WHILE
   Clear K1W table
   Clear K2W table
   WHILE doing calibration bin lifts

APPENDIX I -continued

```
            Dequeue UP digital values
            USING REAR LEFT, REAR RIGHT, ARM ANGLE
            and K1W table
            PERFORM SET REAR CALIBRATION CURVE
            USING FRONT LEFT, FRONT RIGHT, ARM
            ANGLE and K2W table
            PERFORM SET FRONT CALIBRATION CURVE
            Dequeue DOWN digital values
            USING REAR LEFT, REAR RIGHT, ARM ANGLE
            and K1W table
            PERFORM SET REAR CALIBRATION CURVE
            USING FRONT LEFT, FRONT RIGHT, ARM
            ANGLE and K2W table
            PERFORM SET FRONT CALIBRATION CURVE
            END WHILE
            END TASK
2.4)        Weighing
            The following procedure is used to compute a weight
            emptied from a container.
2.4.1)      TASK WEIGHT
            FOR EVER
            Dequeue UP digital values
            FOR the set of REAR LEFT, REAR RIGHT, ARM
            ANGLE readings
            PERFORM COMBINE STRAIN to give combined
            rear up values.
            END FOR
            FOR the set of FRONT LEFT, FRONT RIGHT, ARM
            ANGLE readings
            PERFORM COMBINE STRAIN to give combined
            front up values.
            END FOR
            Dequeue DOWN digital values
            FOR the set of REAR LEFT, REAR RIGHT, ARM
            ANGLE readings
            PERFORM COMBINE STRAIN to give combined
            rear down values.
            END FOR
            FOR the set of FRONT LEFT, FRONT RIGHT, ARM
            ANGLE readings
            PERFORM COMBINE STRAIN to give combined
            front down values.
            END FOR
            USING combined rear up and down values
            PERFORM COMPUTE DELTA STRAIN to give E1
            values
            USING combined front up and down values
            PERFORM COMPUTE DELTA STRAIN to give E2
            values
            USING the set of E1, E2, ARM ANGLE
            PERFORM COMPUTE WEIGHTS
            IF standard deviations outside of tolerance
            Flag inaccurate weight
            END IF
            END FOR
2.4.2)      PROCEDURE COMPUTE DELTA STRAIN
            FOR each reading in set
            Subtract down value from up value to give delta
            END FOR
2.4.3)      PROCEDURE COMPUTE WEIGHT
            FOR each reading in set
            COMPUTE W as (K2W * E1) - (K1W * E2) / K1W *
            K2W * LC12
            END FOR
            USING the set of weights W
            COMPUTE mean and standard deviation
```

We claim:

1. A method of determining a weight of material being emptied from a container wherein said container is lifted to and lowered from an emptying position in a lift, empty and lower cycle by an arm means, and wherein mounted on said arm means are at least one front and at least one rear first sensors having respective first outputs proportional to the weight of said container, said method comprising:

a) selecting at least one measurement position;

b) calibrating said first sensors by recording at said measurement position said respective first outputs from each of said first sensors for both an empty arm means and for an arm means lifting and lowering a calibrating weight;

c) subtracting from said respective first outputs recorded from said first sensors for said calibrating weight, the respective first outputs recorded from said first sensors for said empty arm means, at said measurement position, during both the lift and lower portion of the cycle and recording a difference;

d) lifting, emptying and lowering an unknown load and recording said first outputs from each of said front and rear first sensors for each of said lifting and lowering portions of said cycle at said measurement position;

e) subtracting from said output recorded during the lifting portion of said cycle, said output recorded during the lowering portion of said cycle, at said measurement position, to determine a change in output for each first sensor;

f) computing from said change of output at said front and rear first sensors for said unknown weight and said change of output recorded for said front and rear first sensors of said calibrating weight, at said measurement position, the weight of material emptied from said container.

2. A method as claimed in claim 1 wherein said arm means includes at least one second sensor having an output proportional to an angle of said arm means relative to a fixed plane, and wherein said step of selecting at least one measurement position comprises selecting a range of angles over which said respective first and second outputs are recorded and, said further steps include correlating said respective front and rear first outputs to said second output at a plurality of measurement positions.

3. The method as claimed in claim 2 wherein said step (f) of computing the weight of material emptied from said container includes calculating the weight emptied at each measurement position, discarding any calculated weights outside of an acceptable range, and averaging the remaining weights.

4. The method of claim 2 further including the step of converting said first and second outputs into a form suitable for use in a computational unit.

5. The method of claim 4 wherein said step of converting said output comprises converting analog signals from said sensors to digital signals, prior to said output being recorded in said computational unit.

6. The method of claim 1 further including the step of locating said sensors on a relatively horizontal plane, when said arm means is adjacent said sensing position.

7. The method of claim 6 wherein said sensors are strain gauges, and said step of locating said sensors comprises mounting said strain gauges directly onto said arm means in a position where strain is proportional to a load on said arm means.

8. The method of claim 7 wherein said strain gauges are located on an upper outer or inner bottom surface of the arm means.

9. A load weighing apparatus for weighing a load lifted, emptied and lowered by an arm means, the arm means having a loading portion generally toward one end, and a sensing portion located between the other end and said loading portion, said apparatus comprising:

a first sensor mounted on said load arm on said sensing portion to produce a first output proportion to a force in said sensing portion of said load arm, at a first known location;

a second sensor mounted to said load arm on said sensing portion between said first sensor and the other end, to produce a second output proportional to a force in said sensing portion of said load arm at a second known location;

at least one third sensor to produce a third output to identify at least one measurement position;

a computational unit for separately recording at least said first and second outputs at said measurement position;

a means to separately deliver and input into said computational unit at least said first, second and third outputs, and a source of electrical power whereby said apparatus can be used to determine the difference in weight between an unknown weight lifted by said arm means and lowered by said arm means even where said arm means is of a non-uniform modulus of elasticity or a non-uniform area moment of inertia.

10. The apparatus of claim 9 wherein said arm means pivots about said other end and includes at least one pivoter, and said pivoter is connected to said arm means between said sensing portion and said pivot point.

11. The apparatus of claim 9 wherein a sum or difference of said first and second sensor outputs is not in a continuous fixed proportion to a load carried by said arm means.

12. A load weighing apparatus as claimed in claim 9 wherein said means to separately deliver and input into said computational unit at least said first and second output includes an analog to digital converter.

13. A load weighing apparatus as claimed in claim 12 wherein said computational unit includes means to continuously record values from said first, second and third sensors, when said arm means is in movement through a predetermined weigh zone.

14. A load weighing apparatus as claimed in claim 9 wherein said computational unit further includes:

a means for simultaneously recording output values from said first, second and third sensors for lifting and lowering cycle.

15. A load weighing apparatus as claimed in claim 14 wherein said computational unit further includes:

a means for selecting a plurality of measurement positions in a predetermined weigh zone, for both the lift and lower portions of movement of the arm means and means for recording said first outputs at each of said selected measurement positions.

16. A load weighing apparatus as claimed in claim 15 wherein said computational unit further includes a means for combining said recorded outputs respectively of said first and second sensors at said measurement positions defined by said third sensor, for an empty arm means, for an arm means carrying a calibrating weight, and for an arm means carrying an unknown weight up and an unknown weight down through said weigh zone, to determine a weight difference between said unknown up weight and said unknown down weight.

17. A load weighing apparatus as claimed in claim 16 wherein said means for combining further includes a means for statistically analyzing said determined weights difference to remove erroneous values.

* * * * *